US008924154B2

(12) United States Patent
Nielsen et al.

(10) Patent No.: US 8,924,154 B2
(45) Date of Patent: Dec. 30, 2014

(54) METHODS, APPARATUS AND SYSTEMS FOR DETERMINING CORRECTNESS AND COMPLETENESS OF LOCATE OPERATIONS

(71) Applicant: CertusView Technologies, LLC, Palm Beach Gardens, FL (US)

(72) Inventors: Steven Nielsen, North Palm Beach, FL (US); Curtis Chambers, Palm Beach Gardens, FL (US); Jeffrey Farr, Tequesta, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 72 days.

(21) Appl. No.: 13/846,120

(22) Filed: Mar. 18, 2013

(65) Prior Publication Data

US 2013/0231984 A1 Sep. 5, 2013

Related U.S. Application Data

(63) Continuation of application No. 12/364,339, filed on Feb. 2, 2009, now Pat. No. 8,401,791, which is a continuation of application No. 12/363,951, filed on Feb. 2, 2009, which is a continuation-in-part of application No. 11/685,602, filed on Mar. 13, 2007, now Pat. No. 7,640,105, and a continuation-in-part of application No. 11/696,606, filed on Apr. 4, 2007, now Pat. No. 8,060,304.

(51) Int. Cl.
*G06Q 10/00* (2012.01)
(52) U.S. Cl.
USPC ........................................ 701/521; 705/7.38
(58) Field of Classification Search
USPC .............. 705/7.41, 7.38, 7.39, 7.42; 701/123, 701/521
See application file for complete search history.

(56) References Cited

U.S. PATENT DOCUMENTS

| 4,016,748 A | 4/1977 | Boyens |
| 4,208,653 A | 6/1980 | Abe |
| 4,455,509 A | 6/1984 | Crum et al. |
| 5,349,520 A | 9/1994 | Hickman |

(Continued)

FOREIGN PATENT DOCUMENTS

| CA | 2435290 | 8/2002 |
| CA | 2636137 | 7/2007 |
| CA | 2641355 | 8/2007 |
| WO | WO2008112461 | 9/2008 |

OTHER PUBLICATIONS

U.S. Appl. No. 13/867,521, filed Apr. 22, 2013, Nielsen et al.

(Continued)

*Primary Examiner* — Mark Hellner

(57) ABSTRACT

One or more pieces of equipment (e.g., a locate wand, a marking tool) are used to perform an operation to identify, in response to a ticket, a presence or an absence of an underground facility at a dig area. Data relating to the use of the equipment to perform the operation is electronically processed to determine whether the operation was completed correctly. In one example, ticket information from the ticket also is processed with the data relating to the use of the equipment to determine whether the operation was completed correctly. In another example, the equipment includes a marking apparatus, and data relating to the use of the marking apparatus that is processed includes one or more of marker characteristic information, timing information, supply information and location information relating to one or more markers dispensed by the marking apparatus.

25 Claims, 6 Drawing Sheets

(56) References Cited

U.S. PATENT DOCUMENTS

| | | | |
|---|---|---|---|
| 5,379,045 A | 1/1995 | Gilbert et al. | |
| 5,389,149 A | 2/1995 | Carey et al. | |
| 5,734,348 A | 3/1998 | Aoki et al. | |
| 6,075,481 A | 6/2000 | Eslambolchi | |
| 6,343,290 B1 | 1/2002 | Cossins | |
| 6,417,797 B1 | 7/2002 | Cousins et al. | |
| 6,512,312 B1 | 1/2003 | Herkenrath et al. | |
| 6,526,443 B1 | 2/2003 | Goldsmith et al. | |
| 6,526,526 B1 | 2/2003 | Dong et al. | |
| 6,915,211 B2 | 7/2005 | Kram et al. | |
| 6,980,929 B2 | 12/2005 | Aronstam et al. | |
| 7,003,475 B1 | 2/2006 | Friedland et al. | |
| 7,236,863 B2 | 6/2007 | LaPorte et al. | |
| 7,447,509 B2 | 11/2008 | Cossins | |
| 7,498,816 B1 | 3/2009 | Olsson et al. | |
| 7,730,095 B2 * | 6/2010 | Vishwanath et al. | 707/785 |
| 7,773,095 B1 * | 8/2010 | Badrak et al. | 345/619 |
| 7,889,124 B2 | 2/2011 | Islam et al. | |
| 8,040,272 B1 | 10/2011 | Clodfelter et al. | |
| 8,068,789 B2 | 11/2011 | Bell et al. | |
| 8,077,072 B2 | 12/2011 | Mohamadi et al. | |
| 8,127,865 B2 | 3/2012 | Watson et al. | |
| 8,264,409 B2 | 9/2012 | Miller | |
| 8,473,148 B2 | 6/2013 | Nielsen et al. | |
| 8,480,332 B2 | 7/2013 | Miller | |
| 8,532,341 B2 | 9/2013 | Nielsen et al. | |
| 8,543,937 B2 | 9/2013 | Nielsen et al. | |
| 8,577,707 B2 | 11/2013 | Nielsen et al. | |
| 8,589,201 B2 | 11/2013 | Nielsen et al. | |
| 8,589,202 B2 | 11/2013 | Nielsen et al. | |
| 8,612,090 B2 | 12/2013 | Nielsen et al. | |
| 8,612,148 B2 | 12/2013 | Nielsen et al. | |
| 8,612,271 B2 | 12/2013 | Nielsen et al. | |
| 8,612,276 B1 | 12/2013 | Nielsen et al. | |
| 8,630,463 B2 | 1/2014 | Nielsen et al. | |
| 2002/0029161 A1 | 3/2002 | Brodersen | |
| 2002/0032028 A1 | 3/2002 | Kaupe | |
| 2002/0038076 A1 | 3/2002 | Sheehan et al. | |
| 2002/0055870 A1 | 5/2002 | Thomas | |
| 2002/0153134 A1 | 10/2002 | Newman | |
| 2002/0184235 A1 * | 12/2002 | Young et al. | 707/104.1 |
| 2003/0058164 A1 | 3/2003 | Zhdanov et al. | |
| 2003/0083073 A1 | 5/2003 | Cossins | |
| 2003/0177027 A1 | 9/2003 | DiMarco | |
| 2003/0177051 A1 | 9/2003 | Driscoll et al. | |
| 2003/0216949 A1 | 11/2003 | Kram et al. | |
| 2004/0041892 A1 | 3/2004 | Yoneyama et al. | |
| 2004/0260720 A1 | 12/2004 | Cossins | |
| 2005/0004944 A1 | 1/2005 | Cossins | |
| 2006/0091888 A1 | 5/2006 | Holman et al. | |
| 2006/0235741 A1 | 10/2006 | Deaton et al. | |
| 2008/0021863 A1 | 1/2008 | Evans | |
| 2008/0025614 A1 | 1/2008 | Hintz et al. | |
| 2008/0288267 A1 | 11/2008 | Asher | |
| 2009/0055719 A1 | 2/2009 | Cossins | |
| 2009/0089015 A1 | 4/2009 | Bell et al. | |
| 2009/0204625 A1 | 8/2009 | Chambers et al. | |
| 2009/0223355 A1 | 9/2009 | Manders | |
| 2009/0289637 A1 | 11/2009 | Radtke | |
| 2010/0164787 A1 | 7/2010 | Khosravy et al. | |
| 2010/0170453 A1 | 7/2010 | Betzer-Zilevitch | |
| 2013/0085670 A1 | 4/2013 | Nielsen et al. | |
| 2013/0103318 A1 | 4/2013 | Nielsen et al. | |
| 2013/0135343 A1 | 5/2013 | Nielsen et al. | |
| 2013/0147637 A1 | 6/2013 | Nielsen et al. | |
| 2013/0174072 A9 | 7/2013 | Nielsen et al. | |
| 2013/0186333 A1 | 7/2013 | Nielsen et al. | |
| 2013/0194303 A1 | 8/2013 | Nielsen et al. | |
| 2013/0233883 A1 | 9/2013 | Nielsen et al. | |
| 2013/0251894 A1 | 9/2013 | Nielsen et al. | |
| 2013/0265138 A1 | 10/2013 | Nielsen et al. | |
| 2013/0268199 A1 | 10/2013 | Nielsen et al. | |
| 2013/0287500 A1 | 10/2013 | Miller | |
| 2013/0315449 A1 | 11/2013 | Nielsen et al. | |
| 2014/0022272 A1 | 1/2014 | Nielsen et al. | |
| 2014/0035587 A1 | 2/2014 | Nielsen et al. | |
| 2014/0074970 A1 | 3/2014 | Nielsen et al. | |
| 2014/0122149 A1 | 5/2014 | Nielsen et al. | |

OTHER PUBLICATIONS

Corrected Notice of Allowability dated May 10, 2013 from U.S. Appl. No. 12/797,227.
Corrected Notice of Allowability dated May 13, 2013 from U.S. Appl. No. 12/429,929.
Corrected Notice of Allowability dated May 14, 2013 from U.S. Appl. No. 12/797,202.
Corrected Notice of Allowability from U.S. Appl. No. 12/364,369 dated Apr. 15, 2013.
Corrected Notice of Allowability from U.S. Appl. No. 12/622,768 dated Apr. 3, 2013.
Corrected Notice of Allowability from U.S. Appl. No. 12/703,958 dated Apr. 18, 2013.
Corrected Notice of Allowability from U.S. Appl. No. 12/797,202 dated Apr. 4, 2013.
Corrected Notice of Allowability from U.S. Appl. No. 12/797,227 dated Apr. 17, 2013.
Notice of Allowance dated Mar. 28, 2013 from U.S. Appl. No. 12/797,227.
Notice of Allowance dated Apr. 25, 2013 from U.S. Appl. No. 12/364,359.
Notice of Allowance dated May 10, 2013 from U.S. Appl. No. 12/797,243.
Office Action dated Feb. 26, 2013 from Canadian Application No. 2,738,968.
Office Action dated Mar. 13, 2013 from Chinese Application No. 201080045879.1.
Office Action dated Mar. 27, 2013 from U.S. Appl. No. 12/850,712.
Office Action dated Mar. 28, 2013 from U.S. Appl. No. 12/571,408.
Office Action dated Apr. 18, 2013 from U.S. Appl. No. 12/571,356.
Office Action dated Apr. 24, 2013 from U.S. Appl. No. 12/432,909.
Office Action dated Apr. 26, 2013 from U.S. Appl. No. 12/859,394.
Office Action dated Apr. 29, 2013 from U.S. Appl. No. 12/432,849.
Office Action dated May 10, 2013 from U.S. Appl. No. 12/786,929.
Office Action dated Mar. 25, 2013 from U.S. Appl. No. 12/797,211.
Nielsen et al., co-pending U.S. Publication No. 2013-0085670, published Apr. 4, 2013.
Office Action dated Jun. 20, 2013 from U.S. Appl. No. 12/833,117.
Nielsen et al., co-pending U.S. Patent No. 8,612,148, issued Dec. 17, 2013.
Nielsen et al., co-pending U.S. Publication No. 2013-0194303, published Aug. 1, 2013.
Nielsen et al., co-pending U.S. Publication No. 2013-0251894, published Sep. 26, 2013.
Nielsen et al., co-pending U.S. Publication No. 2014-0074970, published Mar. 13, 2014.
Patent Examination Report dated Sep. 8, 2014 from Australian Application No. 2013200160.
Patent Examination Report dated Aug. 13, 2014 from Australian Application No. 20100282559.
Notice of Allowance dated Jul. 17, 2014 from U.S. Appl. No. 13/644,226.
Office Action dated Jul. 10, 2014 from U.S. Appl. No. 12/786,929.
Office Action dated Jul. 7, 2014 from U.S. Appl. No. 13/867,521.
Combined Search and Examination Report dated Oct. 24, 2013 from GB Application No. 1312313.8.
Corrected Notice of Allowability dated Nov. 22, 2013 from U.S. Appl. No. 12/797,211.
European Search Report and Opinion dated Nov. 28, 2013 from EP Application No. 10808689.3.
Notice of Allowance dated Aug. 2, 2013 from U.S. Appl. No. 12/797,211.
Office Action dated Nov. 5, 2013 from U.S. Appl. No. 12/979,262.
Supplementary European Search Report dated Nov. 7, 2013 from EP Application No. 10810421.7.
Notice of Allowance dated Feb. 26, 2014 from U.S. Appl. No. 13/686,262.

(56) References Cited

OTHER PUBLICATIONS

Office Action dated Mar. 25, 2014 from Canadian Application No. 2,771,286.
Office Action dated Jun. 10, 2014 from U.S. Appl. No. 12/701,468.
Examination Report dated May 28, 2014 for European Application No. 13177282.4.
Notice of Allowance dated Jan. 14, 2014 from U.S. Appl. No. 12/797,169.
Office Action dated Jan. 9, 2014 from Canadian Application No. 2,738,968.
Patent Examination Report No. 1 dated Jan. 24, 2014 from Australian Application No. 2012227240.
Notice of Allowance dated Dec. 23, 2013 from U.S. Appl. No. 12/364,369.
Office Action dated Dec. 30, 2013 from U.S. Appl. No. 13/834,382.
Decision of Final Rejection dated Apr. 24, 2013 from Japanese Application No. 2010-502170.
European Search Report dated Sep. 25, 2013 from European Application No. 13177282.4.
Examination Reported dated Sep. 4, 2013 from GB Application No. GB1107165.1.
Notice of Allowability dated Jul. 5, 2013 from U.S. Appl. No. 12/701,447.
Notice of Allowability dated Jul. 10, 2013 from U.S. Appl. No. 13/795,337.
Notice of Allowance dated Jun. 17, 2013 from Canadian Application No. 2,750,908.
Notice of Allowance dated Jul. 10, 2013 from U.S. Appl. No. 12/571,411.
Notice of Allowance dated Aug. 1, 2013 from U.S. Appl. No. 12/571,401.
Notice of Allowance dated Aug. 27, 2013 from U.S. Appl. No. 12/855,977.
Notice of Allowance dated Sep. 17, 2013 from U.S. Appl. No. 12/859,394.
Notice of Allowance dated Sep. 25, 2013 from U.S. Appl. No. 12/364,369.
Notice of Allowance dated Sep. 25, 2013 from U.S. Appl. No. 12/571,408.
Office Action dated Jun. 17, 2013 from U.S. Appl. No. 12/797,262.
Office Action dated Aug. 7, 2013 from Canadian Application No. 2,739,119.
Office Action dated Aug. 7, 2013 from Canadian Application No. 2,739,320.
Office Action dated Sep. 25, 2013 from U.S. Appl. No. 13/686,262.
Supplemental Notice of Allowability dated Aug. 1, 2013 from U.S. Appl. No. 12/571,411.
Office Action dated Sep. 9, 2013 from U.S. Appl. No. 13/867,521.
Examination Report dated Sep. 4, 2013 from European Application No. 10732529.2.
Office Action dated Oct. 18, 2013 from Chinese Application No. 201080045879.1 with English Translation.
Complaint for Patent Infringement dated Apr. 10, 2013, *CertusView Technologies LLC v. United States Infrastructure Corporation et al.*, Case No. 2:13CV182, USDC Eastern District of Virginia.
Complaint for Patent Infringement dated May 28, 2013, *CertusView Technologies LLC v. S&N Locating Services, LLC et al.*, Case No. 1:13CV346, USDC Eastern District of Virginia.
Office Action dated Jul. 8, 2014 from U.S. Appl. No. 12/568,087.
Notice of Allowance dated May 20, 2014 from U.S. Appl. No. 12/363,951.
Common Ground Alliance, Mar. 2008, "Best Practices Version 5.0", archived online: CGA | Best Practices 2008 <http://web.archive.org/web/20101009040317/http://www.commongroundalliance.com/Content/NavigationMenu/Best_Practices_2008/BP_5.0_March2008_Final.pdf[Best Practices 5.0].
Patent Examination Report dated Sep. 5, 2014 from Australian Application No. 2010358572.
Office Action dated Mar. 7, 2014 from U.S. Appl. No. 12/432,878.
Office Action dated Mar. 26, 2014 from U.S. Appl. No. 12/204,454.
Office Action dated Feb. 11, 2014 from Canadian Application No. 2,729,590.
Office Action dated Feb. 11, 2014 from U.S. Appl. No. 12/432,849.
Office Action dated Feb. 20, 2014 from Canadian Application No. 2,691,780.
Turner, R., "Standard Operating Procedures," *Appendix A for Sampling and Analysis Plan for Interim Groundwater Monitoring Site 3—Ninth Street Landfill* (Tetra Tech NUS, 2008), retrieved online at: Horsham Township Library: Willow Grove Naval Air Station Administrative Record Index <http://htl.mclinc.org/%5CWillowGroveNASAdminRecord%5CPdfs%5CFnial21345_appendA.pdf.
Office Action dated Mar. 26, 2014 from U.S. Appl. No. 12/537,917.
Office Action dated Jun. 10, 2014 from U.S. Appl. No. 13/465,524.
Office Action dated Jul. 17, 2014 from U.S. Appl. No. 12/537,894.
Office Action dated May 23, 2014 from U.S. Appl. No. 12/537,894.
Office Action dated Jul. 31, 2014 from U.S. Appl. No. 12/833,117.
Office Action dated Jul. 31, 2014 from U.S. Appl. No. 12/833,121.
Office Action dated Aug. 4, 2014 from U.S. Appl. No. 12/833,127.
Office Action dated Jan. 15, 2014 from U.S. Appl. No. 12/432,909.
Notice of Allowance dated Nov. 26, 2013 from U.S. Appl. No. 12/833,103.
Office Action dated Nov. 12, 2013 from Canadian Application No. 2,712,126.
Office Action dated Jun. 19, 2013 from U.S. Appl. No. 12/833,103.
Notice of Allowance dated Aug. 21, 2013 from U.S. Appl. No. 12/850,187.
Office Action dated Aug. 21, 2013 from Canadian Application No. 2,739,110.
Office Action dated Aug. 29, 2013 from U.S. Appl. No. 13/465,524.
Office Action dated Sep. 24, 2013 from Canadian Application No. 2,739,094.
Office Action dated Oct. 16, 2013 from Canadian Application No. 2,691,780.
Office Action dated Sep. 24, 2013 from Canadian Application No. 2,739,090.
Office Action dated Oct. 31, 2013 from U.S. Appl. No. 12/572,202.
Office Action dated Aug. 29, 2013 from Canadian Application No. 2,739,090.
Notice of Allowance dated May 20, 2013 from U.S. Appl. No. 12/432,860.
Office Action dated May 23, 2013 from U.S. Appl. No. 12/572,202.
Bauer, S. et al., "Quantification of groundwater contamination in an urban area using integral pumping tests," Journal of Contaminant Hydrology; vol. 75, Issues 3-4; Dec. 2004, pp. 183-213.
Holder, T. et al., A new approach for source zone characterization: the Neckar Valley study. Groundwater Quality: Remediation and Protection, IAHS Publication, vol. 250, IAHS Press, Wallingford, Oxfordshire, UK, pp. 49-55.
Maqsood, I et al., Simulation-based risk assessment of contaminated sites under remediation scenarios, planning periods, and land-use patterns-a Canadian case study, Stoch Environ Res Risk Assess 2005, 19:146-157.
Mike Herbert, Karel Kovar, Universitat Tubingen Geological Institute "Groundwater Quality: Remediation and Projection" IAHS Publication No. 250, Proceedings of the GQ conference held in Tubingen, German from Sep. 21 to 25, 1998.
Notice of Allowance dated Jun. 21, 2013 from U.S. Appl. No. 12/572,260.
Office Action dated Jun. 3, 2013 from Canadian Application No. 2,691,780.
Office Action dated Jun. 19, 2013 from U.S. Appl. No. 12/704,485.
Patent Examination Report No. 2, Australian Application No. 2009300323, May 29, 2013.
Schwarz, R. et al., 1998 Groundwater risk assessment at contaminated sites: a new investigation approach. In: Herbert, M., Kovar, K. (Eds.), GQ'98 Groundwater Quality: Remediation and Protection, IAHS Publication, vol. 250, pp. 68-71.
Patent Examination Report No. 2, Australian Application No. 2009300342, Jul. 1, 2013.

(56) References Cited

OTHER PUBLICATIONS

Office Action dated Jun. 25, 2013 from U.S. Appl. No. 12/833,121.
Office Action dated Jun. 20, 2013 from U.S. Appl. No. 12/833,127.
Office Action dated May 22, 2014 from U.S. Appl. No. 12/850,712.
Office Action dated Oct. 10, 2013 from U.S. Appl. No. 12/850,712.
Office Action dated Jul. 30, 2014 from U.S. Appl. No. 12/572,202.
Office Action dated Apr. 9, 2014 from U.S. Appl. No. 12/537,732.

* cited by examiner

US 8,924,154 B2

METHODS, APPARATUS AND SYSTEMS FOR DETERMINING CORRECTNESS AND COMPLETENESS OF LOCATE OPERATIONS

CROSS-REFERENCE TO RELATED APPLICATION

This application claims the benefit under 35 U.S.C. §120 as a continuation of U.S. patent application Ser. No. 12/364,339, filed Feb. 2, 2009, and entitled "Methods for Evaluating Operation of Marking Apparatus."

Application Ser. No. 12/364,339 claims the benefit under 35 U.S.C. §120 as a continuation of U.S. patent application Ser. No. 12/363,951, filed Feb. 2, 2009, and entitled "Electronically Controlled Marking Apparatus and Methods."

Application Ser. No. 12/363,951 in turn claims the benefit under 35 U.S.C. §120 as a continuation-in-part of U.S. patent application Ser. No. 11/685,602, filed Mar. 13, 2007, and entitled "Marking System and Method with Location and/or Time Tracking."

Application Ser. No. 12/363,951 also claims the benefit under 35 U.S.C. §120 as a continuation-in-part of U.S. patent application Ser. No. 11/696,606, filed Apr. 4, 2007, and entitled "Marking System and Method."

Each of the above-identified applications is hereby incorporated herein by reference in its entirety.

FIELD OF THE INVENTION

This invention relates to marking systems and methods to mark the presence or absence of an underground facility in a dig area.

BACKGROUND

Underground man-made objects, such as utility lines, cables and pipes (hereinafter "underground facilities"), are very susceptible to damage from excavation activities. Local and federal laws require that notification be given to owners of underground facilities in an area to be excavated before any excavation takes place. The owners of the underground facilities typically must locate and mark the location of any underground facilities.

The tasks of locating and marking underground facilities can be performed by either the underground facility owner or by third party contractors. A marking tool is typically used to mark the ground, pavement or other surfaces in order to provide a visual indication of the location of underground facilities. Paint is commonly used as the marker, and it is typically applied using a paint marking tool. The color of the paint is typically chosen based on the type of facility being marked (e.g., red for a power line). However, other types of markers, such as other types of liquids, flags and stakes are also used, and different visual or other characteristics of the marker are used for representing different types of underground facilities. For example, the color, shape or other characteristic of a flag marker can represent a particular type of underground facility (e.g., a square shaped flag can be used to mark a power line).

When paint is used as the marker, a worker marks the location of an underground facility using a paint marking tool to spray paint on the ground to mark the presence or absence of an underground facility. The paint marking tools typically used have a paint canister holder that is adapted to hold a single aerosol can of paint in an axial orientation with respect to the long axis of the aerosol can. The paint marking tool is typically designed to enable a user to walk or stand erect while dispensing the paint.

When an underground facility is located, the worker will load a paint can of the appropriate color for the underground facility being marked into the paint marking tool. When it is time to mark a different type of underground facility, the worker must change the paint can to one of the appropriate color for the new underground facility being marked.

Inaccurate marking of the underground facilities can result in physical damage to underground facilities, property damage, and/or personal injury during the excavation process that, in turn, can expose the underground facility owner or contractor to significant legal liability. When underground facilities are damaged and/or when property damage or personal injury results from hitting a underground facility during an excavation, the excavator may assert that the underground facility was not accurately marked by the entity that carried out the marking, while the entity that marked the underground facility will assert that the underground facility was properly marked. Proving whether the underground facility was properly marked can be difficult after the excavation, because in many cases the paint line used to mark the underground facility will have been disturbed or destroyed during the excavation process.

SUMMARY

According to a first aspect of the invention, a method is provided for operating a marking apparatus that holds a marking dispenser for marking the presence or absence of an underground facility in a dig area, comprising: operating the marking apparatus in association with dispensing a marker from the marking dispenser onto the ground in the dig area to mark the presence or absence of the underground facility; logging one or more data elements associated with operation of the marking apparatus in an electronic record of marking apparatus operation; and analyzing at least part of the electronic record to provide an analysis result that is usable in evaluation of marking apparatus operation.

According to a second aspect of the invention, a marking apparatus is provided to mark the presence or absence of an underground facility in a dig area, comprising: a housing configured to enable dispensing of a marker onto the ground for marking the presence or absence of an underground facility in a dig area; a marking dispenser holder affixed to the housing to hold a replaceable marking dispenser; an actuator to enable a user to cause dispensing of the marker from the marking dispenser onto the ground to mark the presence or absence of an underground facility in a dig area; and a processing device to log one or more data elements associated with operation of the marking apparatus in an electronic record of marking apparatus operation and to analyze at least a part of the electronic record to provide an analysis result that is usable in evaluation of the marking apparatus operation.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Figure 1:
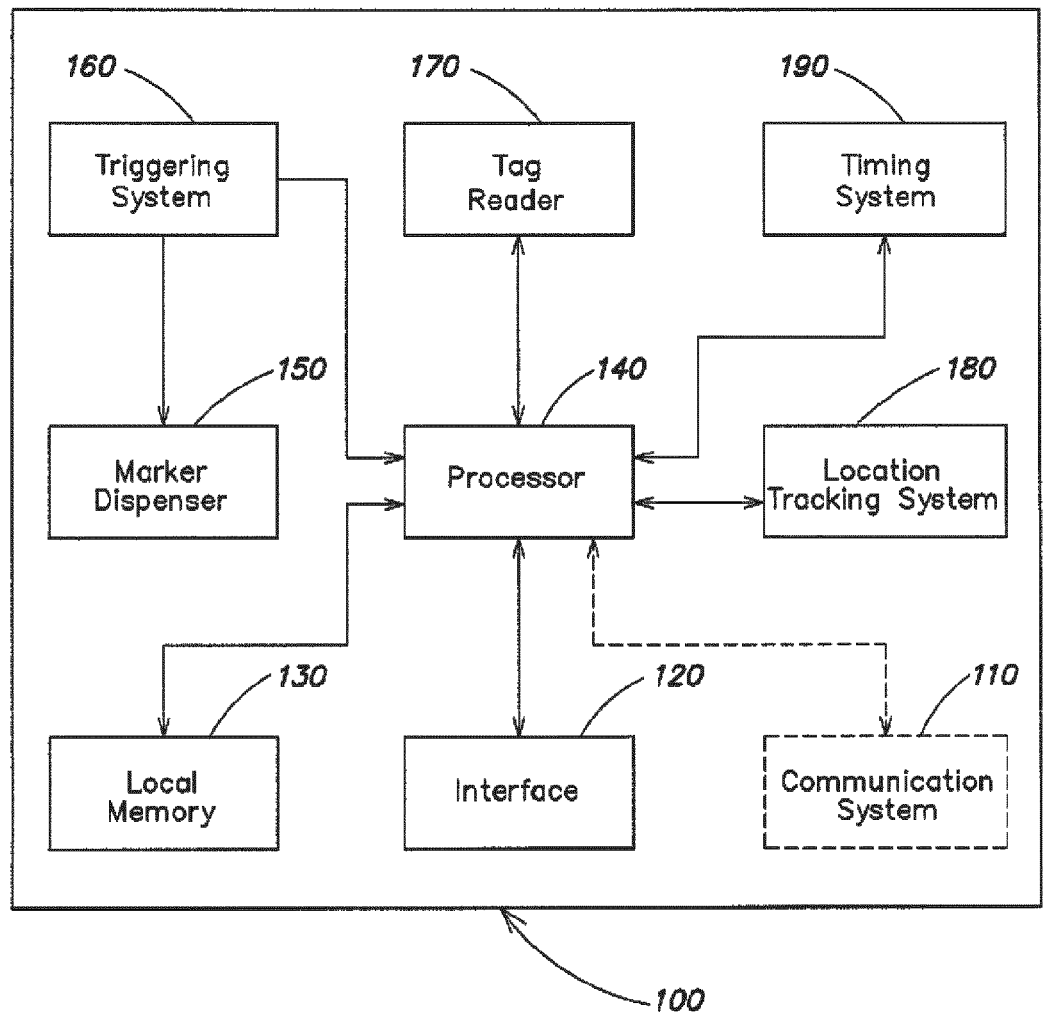
FIG. 1 is a block diagram of an exemplary marking system.

FIG. 1 is a block diagram of an exemplary marking system 100. The system 100 may include a communication system 110, an interface 120, a local memory 130, a processor 140, a marker dispenser 150, a triggering system 160, a tag reader 170, a location tracking system 180, and a timing system 190. In other implementations, system 100 may include additional or different components. In some embodiments, one or more of the communication system 110, the tag reader 170, the location tracking system 180 and the timing system 190 may be omitted, depending on the particular application of the marking system 100.

The system 100 may be used to dispense markers. In one exemplary application of the system 100, the markers may be used to mark underground facilities, such as telecommunications (e.g., telephone and/or cable), power, gas, water, or sewer. The marker that is used to mark underground facilities may include a liquid, such as paint, or objects, such as flags, stakes, etc.

A user may control the operation of the system 100 via interface 120. In one implementation, interface 120 may include a touch screen interface that can provide various operational controls and status indicators of the system 100, and can allow the user to navigate the controls by touching particular areas of the screen. In another implementation, the interface 120 may include another form of input and/or output, such as, for example, a display for displaying information and a keypad for entering information. In either situation, the interface 120 may provide operational controls to function as the triggering system 160.

The triggering system 160 may trigger the dispensing of markers and the storing of marking information. The marking information, which will be described in more detail below, may include information regarding a characteristic of the marker(s) being dispensed, time data (e.g., a timestamp and/or elapsed time information), and/or count data (e.g., a number of times that markers were dispensed). In operation, a user may engage a triggering mechanism in the triggering system 160 (explained in more detail below) in order to dispense the markers. When the triggering mechanism is engaged, the triggering system 160 may also initiate storing of the marking information. This may be done by sending a signal to the processor 140, which may cause processor 140 to store the marking information in local memory 130. Alternatively, or additionally, the processor 140 may store the marking information by transmitting the marking information for storage by a device or system external to system 100. In one implementation, marking information may be stored only when a marker is being dispensed by the marker dispenser 150.

The marker dispenser 150 may hold the markers and may also contain an actuation mechanism (not shown in FIG. 1) that causes the markers to be dispensed when the triggering system 160 is activated. As described above, the markers dispensed by the marker dispenser 150 may include a liquid (e.g., paint) or an object (e.g., flags or stakes). Details of the marker dispenser 150 will be discussed in more detail below.

The system 100 may also include a tag reader 170. In one implementation, tag reader 170 may include a device that can read tags. A "tag," as the term is used herein, may refer to any item that is capable of storing machine-readable information, such as a barcode, a radio frequency identification (RFID) device, or a near field communication (NFC) device. A tag may be passive, active, or any combination thereof. A passive tag may transmit data in response to signals received from tag reader 170. An active tag may continuously transmit data. Tags can be attached to the markers that are loaded into the marker dispenser 150 and can incorporate data that corresponds to one or more characteristics of the marker (e.g., paint color if the marker is paint). Other examples of marker characteristics include, but are not limited to, the type of marker and a shape of marker. The tag reader 170 may incorporate an antenna (not shown) to enable reading the data from a tag (whether passive, active, or any combination thereof). The data read by the tag reader 170 can then be sent to the processor 140 for a determination of the corresponding characteristic. The corresponding characteristic can then be stored in local memory 130, displayed by the interface 120, and/or transmitted external to system 100.

Communication system 110 may include an interface for transmitting data to and/or receiving data from one or more external devices and/or systems located either local to or remote from the system 100. Communication system 110 may include any type of interface, such as an interface for communicating via Ethernet, Bluetooth, Wifi, radio frequency (RF), a wide area network (WAN), or another type of network or protocol.

In one implementation, communication system 110 may send marking information stored in local memory 130 to an external device/system and/or receive information from an external device/system. The marking information may be used by the external device/system to identify a marker dispensed by a user of system 100, identify a time at which the marker was dispensed, and/or determine an amount of the marker used at a particular location.

In one implementation, the system 100 may be used to accurately record the geographic location where markers are dispensed using data from the location tracking system 180 and/or the time at which the markers are dispensed using data from the timing system 190. In one exemplary application of the system 100, the location of markers used to mark underground facilities and/or the time at which the markers are dispensed can be accurately and reliably recorded. The marker that is used to mark underground facilities may include a liquid, such as paint. However, other types of markers, such as objects (e.g., flags, stakes, etc.), may be used in other implementations.

The location tracking system 180 may include any device that can determine its geographic location to a certain degree of accuracy, such as a global positioning system (GPS) or a global navigation satellite system (GNSS) receiver. In another implementation, the location tracking system 180 can include a device that determines location using another technique, such as tower (e.g., cellular tower) triangularization.

The location tracking system 180 may receive location-tracking signals (e.g., GPS signals) and determine its location based on these signals. In one implementation, the location tracking system 180 may be capable of determining its location within less than approximately thirty centimeters.

The timing system 190 may include any device that can output time data to some level of accuracy (e.g., accuracy to the minute, the second, the millisecond, etc.). In one implementation, the timing system 190 may be capable of generating the time data itself. In this situation, the timing system

190 may take the form of a clock. In another implementation, the timing system 190 may receive the time data from another timing system. In this situation, the timing system 190 may take the form of a receiver. In some situations, it may be beneficial for the timing system 190 to be synchronized to another timing system.

The triggering system 160 may trigger the logging of location and/or time data and the dispensing of markers. In one implementation, the system 100 may log location and/or time data only when a marker is being dispensed by the marker dispenser 150. This may be accomplished via a triggering mechanism that, when actuated by the user, triggers both the marker dispenser 150 and the logging of location and/or time data. The location data may be received from the location tracking system 180, and logged and stored in local memory 130 by the processor 140. The time data may be received from the timing system 190, and logged and stored in local memory 130 by the processor 140.

In operation, a user may engage a triggering mechanism in the triggering system 160 (explained in more detail below) in order to dispense the markers. When the triggering mechanism is engaged, the triggering system 160 may also initiate logging of location data received from the location tracking system 180 and/or time data received from the timing system 190. This may be done by sending a signal to the processor 140, which may cause processor 140 to store a log of the location and/or time data in local memory 130.

In one implementation, communication system 110 may send location and/or time data logs stored in local memory 130 to an external device/system and/or receive information from an external device/system. The location data logs may be used by the external device/system to accurately track the location where the markers were dispensed. The time data logs may be used by the external device/system to accurately track a time at which the markers were dispensed.

As discussed above, marking information, count data, location information and/or time data may be stored, or logged, in local memory 130 by processor 140. Alternatively or additionally, the marking information, count data, location information and/or time data may be transmitted to an external device or system, using communication system 110, for storage and/or analysis. The logging and/or transmission of such information may be initiated by actuation of the triggering mechanism for dispensing of markers or by other events, such as operation of tag reader 170.

System 100, as broadly described herein, may be particularly suited for incorporation into marking tools for marking underground utilities. As discussed above, a marking tool is used to mark the ground, pavement or other surfaces in order to provide a visual indication of the location of underground utilities. The type of marker that may be used includes paint that may be supplied in aerosol canisters that are oriented axially with respect to the long axis of the aerosol canisters. The marking tool enables a user to walk or stand erect while dispensing the markers.

If system 100 is incorporated into a paint marking tool, a tag may be attached to the paint canisters to identify a characteristic of the paint, such as the color of the paint in the paint canister. The tag reader 170 can read this paint characteristic (e.g., the color information) from the tag when the paint canister is inserted into the marker dispenser 150, and the processor 140 can display the color information read by the tag reader 170 on the interface 120. Alternatively, or additionally, the color information may be provided to the user in other ways. For example, the color information may be audibly provided to the user (e.g., via a generated voice or a series of beeps or honks) The color information may also, or alternatively, be provided to the user visually in a manner other than via interface 120. For example, the color information may be provided on an object worn or carried by the user (e.g., a pair of glasses, a bracelet, a ring, etc. having display capabilities and/or being capable of changing color).

In one implementation, the processor 140 can estimate how much paint of a particular color has been dispensed. The processor 140 could do this by maintaining a separate timer for each color. The timer for a particular color would increase its count every time the triggering mechanism is activated and that color is mounted in the marker dispenser 150 (which can be determined by reading the tag on the paint canister using the tag reader 170). This information can be useful for managing paint inventory or determining whether the amount of paint used at a particular location is reasonable given the job to be performed at that location.

A paint marking tool is just one possible application of system 100. System 100 can be applied to any marking system that uses markers that can be affixed with tags. Any marker characteristic that a user would find useful can be stored on the tag that is affixed to the marker.

Figure 2:
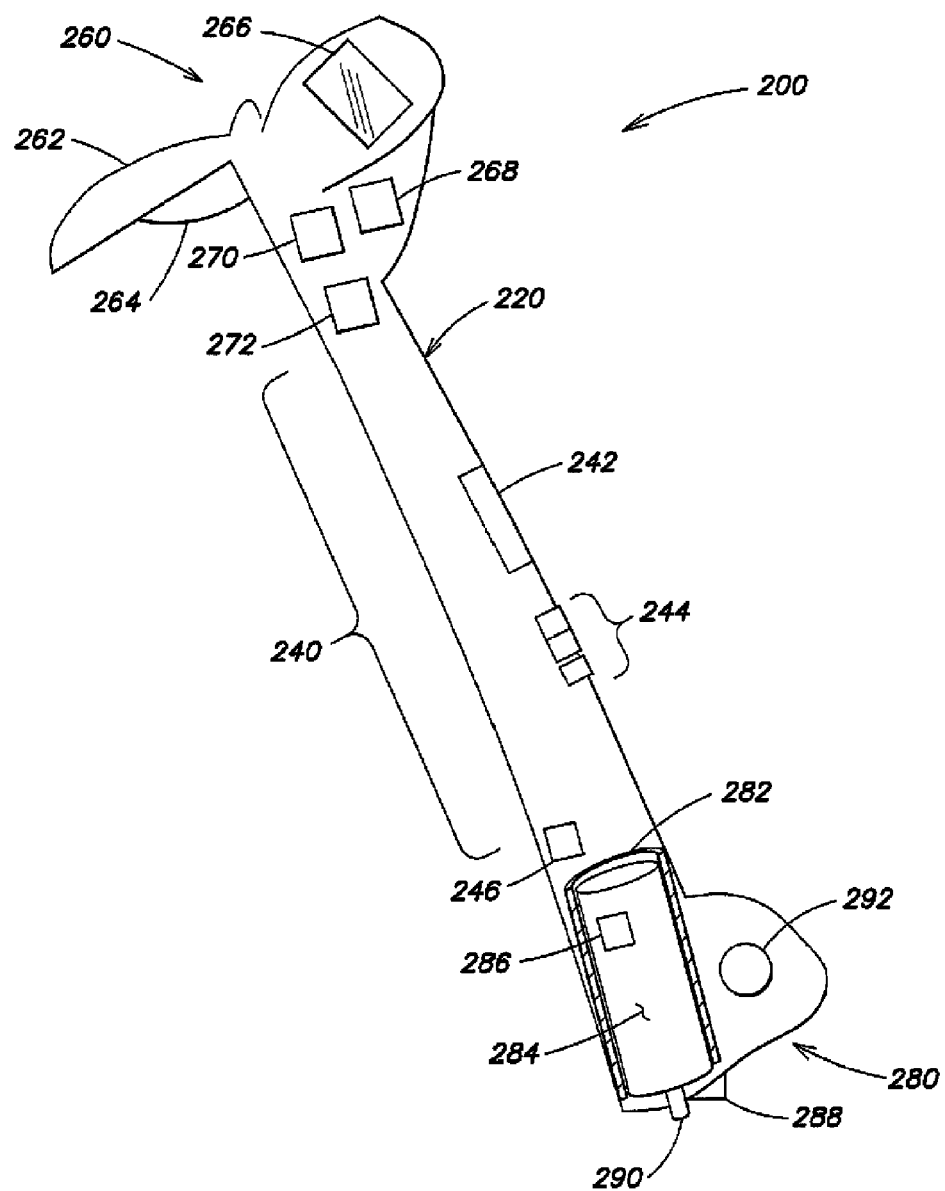
FIG. 2 is a diagram of an exemplary marking tool.

FIG. 2 is a diagram of an exemplary marking tool 200. For the description to follow, assume that the marking tool 200 uses paint as the marker. However, it should be appreciated that any other marker, such as another type of liquid, flags, stakes, etc., may be used in other implementations.

The marking tool 200 may include a housing 220 with an elongated center housing portion 240, a top housing portion 260 and a bottom housing portion 280. The housing 220 may be formed of any at least semi-rigid material, and may be formed of a lightweight material such as aluminum or plastic.

A paint canister holder 282 may be attached to the bottom housing portion 280. The paint canister holder 282 may include an open-ended tubular structure that is attached to the bottom housing portion 280 by any suitable attachment mechanisms, such as rivets, adhesive, mechanical fasteners or the like. The paint canister holder 282 may be formed of any material such as injection-molded plastic, formed sheet metal or any other appropriate material that may be fabricated into an open tubular configuration or any other configuration that will serve to support a paint canister 284 with the paint canister axis substantially parallel to the housing 220.

A tag reader 246, which may include a device that can read tags, may be mounted on or located within the housing 220. The tag reader 246 may incorporate an antenna (not shown) to enable reading of data from a tag. When a tag 286 is attached to a paint canister 284 that incorporates data that corresponds to characteristics of the paint (e.g., paint color), the tag reader 246 may read that data. Other examples of marker characteristics include, but are not limited to, the type of marker and the shape of marker. The data read by the tag reader 246 can then be sent to a processor 268 for a determination of the corresponding characteristic. The corresponding characteristic can then be provided to the user, stored in local memory 270, and/or transmitted external to marking tool 200.

The tag reader 246 may be mounted anywhere on the housing or on the paint canister holder 282. However, the tag reader 246 does not have to be mounted anywhere on the marking tool 200 itself. For example, the tag reader 246 may be carried by a user. In general, the tag reader 246 may be mounted or located at any location, as long as it can receive data transmitted from the tag 286.

An actuation mechanism 288 may be attached to the bottom housing portion 280 at a location from which it can actuate the nozzle 290 of the paint canister 284. The actuation mechanism 288 may include a rigid material that depresses the nozzle 290 when actuated. However, any mechanism may be used to actuate the nozzle 290 of the paint canister 284.

A handle 262 may be provided at the top housing portion 260. The handle 262 may be formed of injection-molded plastic or any other appropriate material, and may be attached to the top housing portion 260 by rivets, adhesive, or any other suitable means. A mechanical trigger 264 may be provided on the top housing portion 260. The mechanical trigger 264 may be located on the handle 262 and attached using any suitable means.

The display 266 may be provided on the top housing portion 260. The display 266 may include a touch-screen display for displaying information to a user, as well as acting as an input device. The processor 268 and the local memory 270 are located in the housing 220. In one implementation, the processor 268 and local memory 270 may be located in the top housing portion 260 so as to be in close proximity to the display 266 and mechanical trigger 264. In another implementation, the processor 268 and local memory 270 may be located elsewhere within the housing 220.

A timer 272 may be provided on the top housing portion 260 or may be located elsewhere within the housing. The timer 272 may include any device that can output time data to some level of accuracy (e.g., accuracy to the minute, the second, the millisecond, etc.). In one implementation, the timer 272 may be capable of generating the time data itself. In this situation, the timer 272 may take the form of a clock. In another implementation, the timer 272 may receive the time data from another device external to marking tool 200. In this situation, the timer 272 may take the form of a receiver. In some situations, it may be beneficial for the timer 272 to be synchronized to another timer. The timer 272 may output time data to the processor 268.

A wireless communication antenna 242 may be located on the housing 220, and used to transmit data, such as marking information, location information and/or time data stored in local memory 270, to an external device/system and/or to receive information from an external device/system.

A location tracking system receiver 292 for receiving location tracking signals (e.g., GPS signals) may be mounted inside the housing 220. In the embodiment of FIG. 2, the location tracking system receiver 292 may be located at the bottom housing portion 280. In another embodiment, the location tracking system receiver 292 may be located elsewhere within or on the housing 220 at a location that optimizes signal reception. However, the location tracking system receiver 292 does not have to be mounted anywhere on the marker tool itself. For example, the location tracking system receiver 292 may be carried by a user. In general, the location tracking system receiver 292 may be mounted or located at any location, as long as it can receive the location tracking signals.

The marking tool 200 may also include one or more input/output ports 244, such as USB, SCSI, Firewire, Ethernet and/or other ports, for interfacing with other equipment and/or computers.

In operation, a user operates the marking tool 200 while standing or walking in an upright manner. A user may control the operation of the tool 200 via display 266, a mechanical trigger 264, and/or a wireless or wired (hereinafter "wireless/wired") interface that may be provided via wireless communication antenna 242 and/or input/output ports 244.

The various operational controls and status indicators of the tool 200 are displayed on display 266, and the user can also navigate the controls by touching particular areas of the display 266. Although a touch-screen display is one form of the display 266, any other type of display or interface may be used such as, for example, a display for displaying information and a keypad for entering information. The user may use the display 266 to trigger the dispensing of paint and the storing, or logging, of marking information, location information and/or time data.

The mechanical trigger 264 may trigger the dispensing of paint and the storing of marking information. In one implementation, the tool 200 may store the marking information only when paint is being dispensed. This may be accomplished by using a mechanical trigger 264 that, when activated by the user, triggers both the actuation mechanism 288 for the paint canister 284 and the storing of the marking information by the processor 268.

The mechanical trigger 264 may trigger the logging of the location data (e.g., GPS coordinate) and/or the time data, and the dispensing of paint. In one implementation, the tool 200 may log the location and/or time data only when paint is being dispensed. This may be accomplished by utilizing a mechanical trigger 264 that, when actuated by the user, substantially simultaneously triggers both the actuation mechanism 288 for the paint canister 284 and the logging of the location and/or time data by the processor 268. The processor 268 may receive the location data from the location tracking system receiver 292, the time data from the timer 272, and store the location and/or time data in local memory 270.

The mechanical trigger 264 can trigger the actuation mechanism 288 via a mechanical connection between the trigger 264 and the actuation mechanism 288. For example, the actuation mechanism 288 can be a rigid material that is connected to the mechanical trigger 264 via a mechanical linkage (not shown), in which case depressing the mechanical trigger 264 may cause the actuation mechanism to apply pressure to the nozzle 290 of the paint canister 284. However, the mechanical trigger 264 may also, or alternatively, trigger the actuation mechanism 288 via an electronic connection. The electronic connection may be a hardwired connection or a wireless connection. If the connection between the mechanical trigger 264 and the actuation mechanism 288 is an electronic connection, the actuation mechanism 288 may include a mechanism for generating the force necessary to depress the nozzle 290 of the paint canister 284.

The wireless/wired interface may be capable of capturing signals that reflect a user's intent. For example, the wireless/wired interface may include a microphone that can capture a user's intent by capturing the user's audible commands. Alternatively, the wireless/wired interface may interact with a device that monitors a condition of the user, such as eye movement, brain activity, or heart rate. In either event, the wireless/wired interface may generate signals that may be sent to the processor 268 for processing. The processor 268 may use the signals to trigger the dispensing of paint and the storing of marking information, location information and/or time data.

Figure 3:
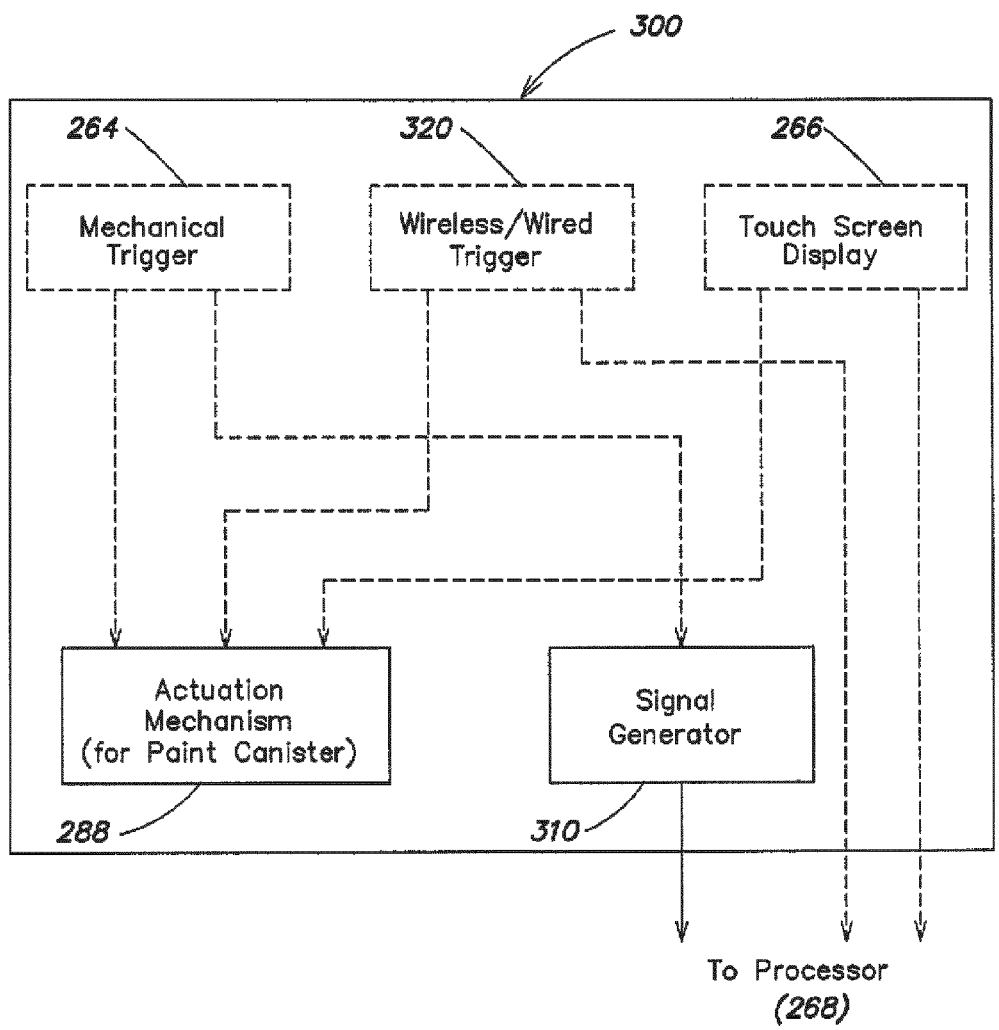
FIG. 3 is a diagram of an exemplary triggering system that may be used in the marking tool of FIG. 2.

FIG. 3 is a diagram of one embodiment of a triggering system 300 that may be used in the marking tool 200 of FIG. 2. As shown in FIG. 3, the triggering system 300 may include the mechanical trigger 264, a wireless/wired trigger 320, and/or a touch screen display 266, the actuation mechanism 288, and a signal generator 310.

In operation, a user may trigger the storing of the marking information, the location information and/or the time data, and the dispensing of paint by activating the mechanical trigger 264. The storing of the marking information, the location information and/or the time data and the dispensing of paint may also, or alternatively, be triggered by a trigger signal from wireless/wired trigger 320 or by choosing a command that is displayed on the touch screen display 266. It should be appreciated that triggering system 300 may include a mechanical trigger 264, a trigger signal from wireless/wired trigger 320, a trigger command on a touch screen display 266, or a combination of a mechanical trigger 264, a trigger signal from wireless/wired trigger 320, and/or a trigger command on a touch screen display 266 for initiating the storing of the marking information, the location information and/or the time data, and the dispensing of paint.

When a user activates the mechanical trigger 264, the actuation mechanism 288 and the signal generator 310 are both activated. The actuation mechanism 288 actuates the nozzle 290 of the paint canister 284, thus dispensing paint out of the paint canister 284. The signal generator 310, when activated, sends a signal to the processor 268 indicating that the mechanical trigger is being activated. As discussed above, this signal could be used to trigger the storing of marking information and/or a timer for keeping track of how much paint of a particular color has been dispensed when a tag 286 that identifies the paint color is attached to the paint canister 284 that is mounted in the paint canister holder 282.

When a user actuates the mechanical trigger 264, the actuation mechanism 288 and the signal generator 310 are both activated. The actuation mechanism 288 actuates the nozzle 290 of the paint canister 284, thus dispensing paint out of the paint canister 284. The signal generator 310, when activated, sends a start log signal to the processor 268 for triggering the logging of location and/or time data. For example, the start log signal may instruct the processor 268 to read, or otherwise obtain, location data from location tracking system 180 (FIG. 1) or the location tracking system receiver 292 (FIG. 2), and store the location data in local memory 130 (FIG. 1) or 270 (FIG. 2). In addition, or alternatively, the start log signal may instruct the processor 268 to read, or otherwise obtain, time data from timing system 190 (FIG. 1) or the timer 272 (FIG. 2), and store the time data in local memory 130 (FIG. 1) or 270 (FIG. 2).

The mechanical trigger 264 can activate the actuation mechanism 288 via a mechanical connection, e.g., a mechanical linkage, between the mechanical trigger 264 and the actuation mechanism 288. Alternatively, the mechanical trigger 264 can activate the actuation mechanism 288 via a wired or wireless electronic connection between the mechanical trigger 264 and the actuation mechanism 288.

If a trigger signal from wireless/wired trigger 320 is used by the user to initiate marking information storing and paint dispersal, the wireless/wired trigger 320 may send a signal to both the actuation mechanism 288 and the processor 268. The signal sent to the actuation mechanism 288 by the wireless/wired trigger 320 may result in the actuation of the nozzle 290 of the paint canister 284 by the actuation mechanism 288. The signal sent to the processor 268 by the wireless/wired trigger 320 may trigger the storing of the marking information, the location information and/or the time data. The signals sent by the wireless/wired trigger 320 to the actuation mechanism 288 and the processor 268 may be sent via a wired or wireless connection.

If a command on the touch screen display 266 is used by the user to initiate storing of marking information, the location information and/or the time data, and paint dispensing, the touch screen display 266 can send a signal to both the actuation mechanism 288 and the processor 268. The signal sent to the actuation mechanism 288 by the touch screen display 266 may result in the actuation of the nozzle 290 of the paint canister 284 by the actuation mechanism 288. The signal sent to the processor 268 by the touch screen display 266 may trigger the storing of the marking information, the location information and/or the time data. The signals sent by the touch screen display 266 to the actuation mechanism 288 and the processor 268 may be sent via a wired or wireless connection.

The marking information may be used by an external device and/or system to identify which markers were dispensed, when the markers were dispensed, and/or an amount of markers that were dispensed. The marking information may be useful to determine whether a user dispensed the correct marker(s) (e.g., the correct color paint) in a particular location. Also, the marking information may be used to visually depict (e.g., in real time as the dispensing occurs) or reconstruct (e.g., at a later time after the dispensing is complete) the dispensing of the markers on an electronic representation of the area that is currently being marked or was previously marked. Also, the marking information may be used to determine whether the job was completed correctly (e.g., that the amount of paint dispensed at the location was reasonable given the job that was to be performed at the location).

The logged location and/or time data may be used by an external device and/or system to track the dispensing of markers with a high degree of accuracy. The logged location and/or time data may be useful when disputes arise regarding whether the dispensed markers were placed in the correct location. Also, the logged data may be used to visually depict (e.g., in real time as the dispensing occurs) or reconstruct (e.g., at a later time after the dispensing is complete) the dispensing of the markers on an electronic representation of the area that is currently being marked or was previously marked.

Figure 4:
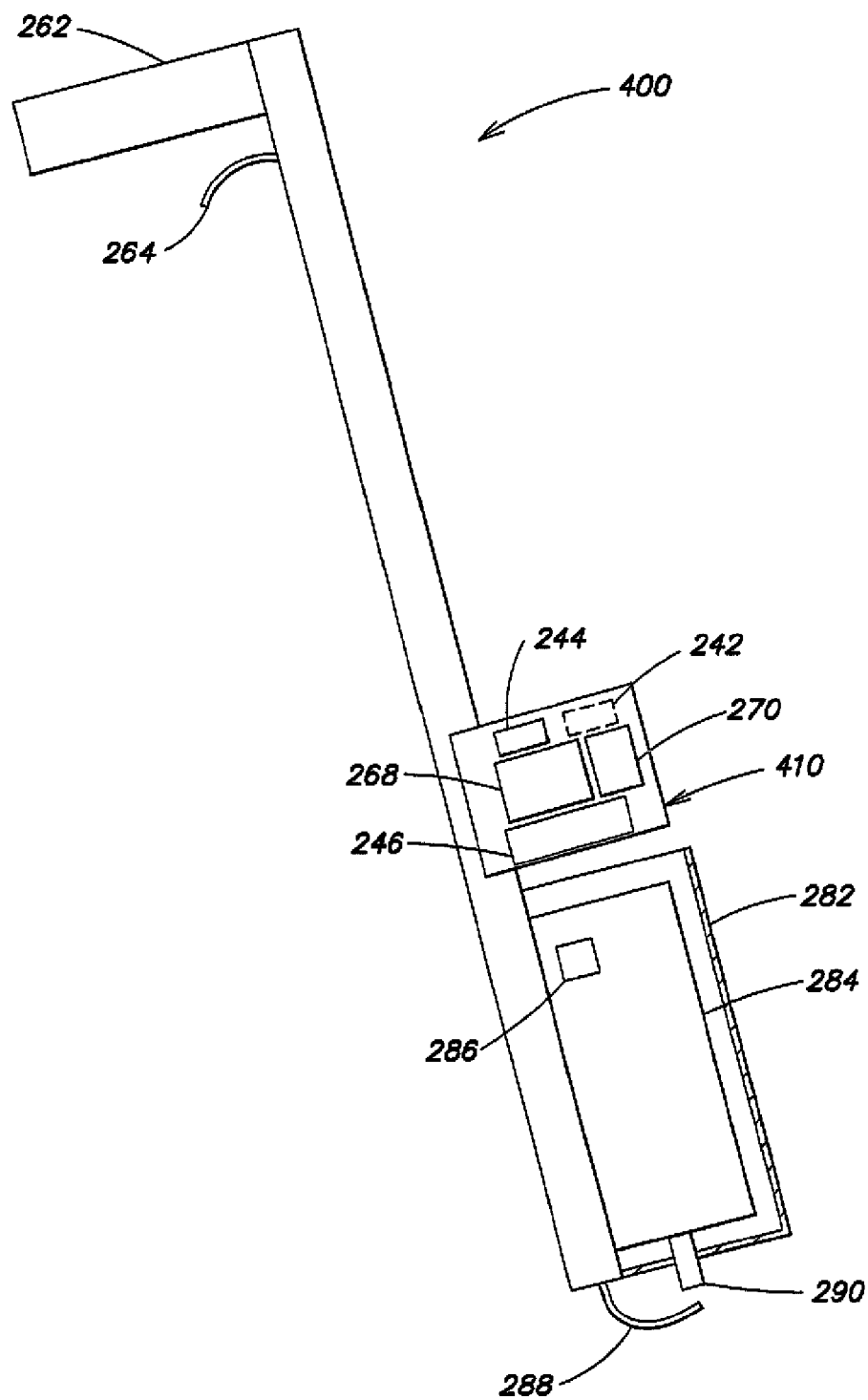
FIG. 4 is a diagram of another exemplary marking tool.

As shown in FIG. 4, the marking system 100 may be incorporated into already existing marking tools by locating the electronics on a board 410 that can be mounted onto an existing marking tool 400. The processor 268, local memory 270, input/output ports 244, tag reader 246 and/or wireless communication antenna 242 may be mounted on the board 410. The board 410 can be attached to the marking tool 400 using any means, such as with fasteners, clamps, glue, etc.

Figure 5:
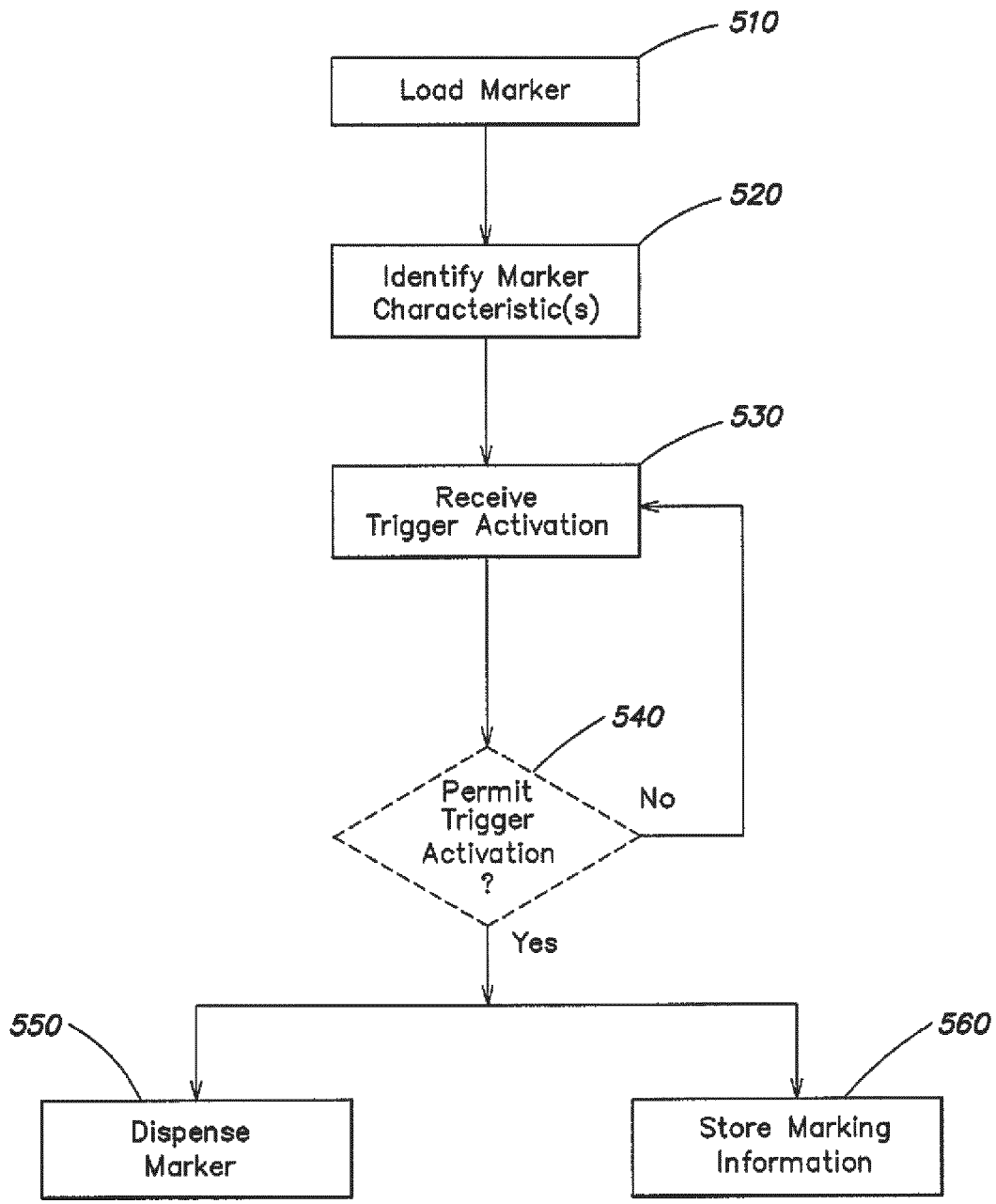
FIG. 5 is a flowchart of an exemplary process for marking an area.

FIG. 5 is a flowchart of an exemplary process for marking an area. The process of FIG. 5 may begin with a user of a marking tool, such as marking tool 200 (FIG. 2), being dispatched to a location to be marked. The user might be given a ticket that identifies what utilities the user needs to mark at the location. The ticket might specify, for example, the location to be marked, the day and/or time that the location is to be marked, and/or whether the user is to mark the location for telecommunications (e.g., telephone and/or cable), power, gas, water, and/or sewer. The user might arrive at the location and take his/her marking tool out of his/her vehicle. In some situations, the user might load his/her pockets with extra markers (e.g., extra canisters of the same color of paint or different colors of paint).

A marker may be loaded into the marking tool (block 510). For example, the user may load a paint canister 284 of the appropriate color into paint canister holder 282. If the user is going to mark power, for example, the user might load a paint canister 284 containing red paint. The paint canister 284 may be loaded such that nozzle 290 extends out of the bottom of the marking tool 200, as illustrated in FIG. 2.

In one implementation, as described above, a tag 286 may be affixed to the paint canister 284. The tag 286 may store information regarding one or more characteristics of the marker. For example, the tag 286 may identify the type of marker (e.g., paint, flag, stake, etc.), the color of marker (e.g., orange, red, yellow, blue, or green), and/or the shape of the marker (e.g., square, triangular, circular, etc.).

The marker characteristic(s) may be identified (block 520). In one implementation, the marker characteristic(s) may be automatically determined. For example, data from the tag 286 may be read by tag reader 246 and sent to processor 268. The processor 268 may determine the marker characteristic(s) from this data, and cause information regarding the marker characteristic(s) to be presented to the user (e.g., visually and/or audibly).

For example, a user interface may identify a characteristic of the marker. The user interface may optionally request the user to confirm that the user intended to load a marker with the identified characteristic. The confirmation may establish that the user actually looked at the user interface before performing any marking operation. In one implementation, the user may be unable to activate a trigger for dispensing a marker if the user does not confirm that the correct marker is loaded.

In another implementation, the marker characteristic(s) may be manually determined. For example, the user may specify the marker characteristic(s) via a user interface. The user interface may identify a number of possible characteristics (e.g., paint colors) of the marker. In this case, the user interface may request that that user select the paint color to be dispensed. The user interface may also identify the utility that corresponds to each of the possible paint colors so that the user can confirm that the correct marker is loaded.

Trigger activation may be received (block 530). For example, the user may effect trigger activation by applying pressure to the mechanical trigger 264 with his/her hand. Alternatively, or additionally, the user may effect trigger activation by, for example, speaking a particular command to cause a trigger signal to be output by wireless/wired trigger 320. Alternatively, or additionally, the user may effect trigger activation by touching a particular area of display 266 to cause a trigger command to be output by display 266.

It may optionally be determined whether to permit trigger activation (block 540). For example, the user may be required to confirm that a marker with the correct marker characteristic was loaded before trigger activation may be permitted. Alternatively, the marking tool 200 may be loaded with information from the user's ticket. In this case, trigger activation may be prevented when the marker characteristic of the marker does not match the ticket information. For example, if the ticket information indicates that the user is to dispense blue and yellow paint at a particular location, then activation of the trigger may be permitted if blue or yellow paint is loaded into the marking tool 200, and activation of the trigger may be prevented otherwise.

If activation of the trigger is permitted, then a marker may be dispensed (block 550), and marking information may be stored (block 560). To dispense a marker (block 550), the actuation mechanism 288 may be activated to cause the nozzle 290 of the paint canister 284 to be depressed, which may cause paint from the paint canister 284 to be output via the nozzle 290.

To store marking information (block 560), a signal may be sent to the processor 268. The signal may be sent from the signal generator 310, the wireless/wired trigger 320, and/or the display 266, as described above. The signal may instruct the processor 268 to store the marking information. For example, the processor 268 may store the marking information in local memory 270. In this case, the processor 268 may create an entry in local memory 270. Alternatively, or additionally, the processor 268 may store the marking information by transmitting the marking information for storage by a device or system external to marking tool 200.

Figure 6A:
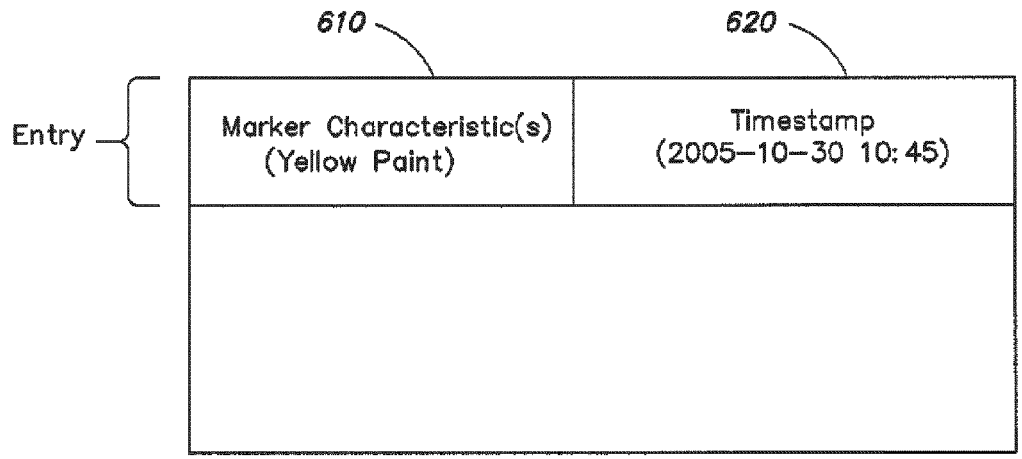
FIGS. 6A-6C are diagrams of exemplary entries that can be created.

FIG. 6A is a diagram of an exemplary entry that may be created. As shown in FIG. 6A, an entry may include a marker characteristic(s) field 610 and a timestamp field 620. The marker characteristic(s) field 610 may include information regarding one or more marker characteristics, such as marker color, marker shape, or marker type. The information in the marker characteristic(s) field 610 is shown in FIG. 6A as "yellow" or "yellow paint"—although any type of descriptive information may be used. The timestamp field 620 may include time data that identifies the day and/or time that the marker was dispensed. The time data in the timestamp field 620 is shown in FIG. 6A as 10:45 a.m. on Oct. 20, 2005—although any type of date and/or time code may be used. As explained above, the marking information may be useful to determine whether the user dispensed the correct marker(s) (e.g., the correct color paint) in a particular location. For example, the user's ticket may identify what underground facilities were to be marked in the area. The marking information may help insure that the job was completed correctly.

Figure 6B:
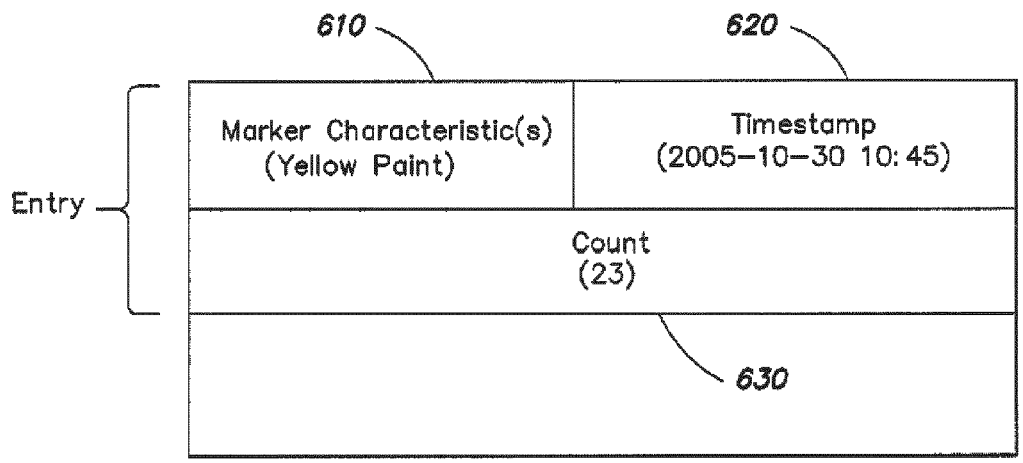

FIG. 6B is a diagram of another exemplary entry that may be created. As shown in FIG. 6B, an entry may include a marker characteristic(s) field 610, a timestamp field 620, and a count field 630. The marker characteristic(s) field 610 and the timestamp field 620 may be similar to the similarly named fields in FIG. 6A. The count field 630 may include information that identifies the number of times that the user activated the trigger to dispense a marker (e.g., yellow paint). The information in the count field 630 is shown in FIG. 6B as twenty-three—although any count value can be used. The information in the count field 630 may be useful to determine or estimate an amount of paint that was dispensed at the location and, thus, whether the amount of paint was reasonable given the job that was to be performed.

Figure 6C:
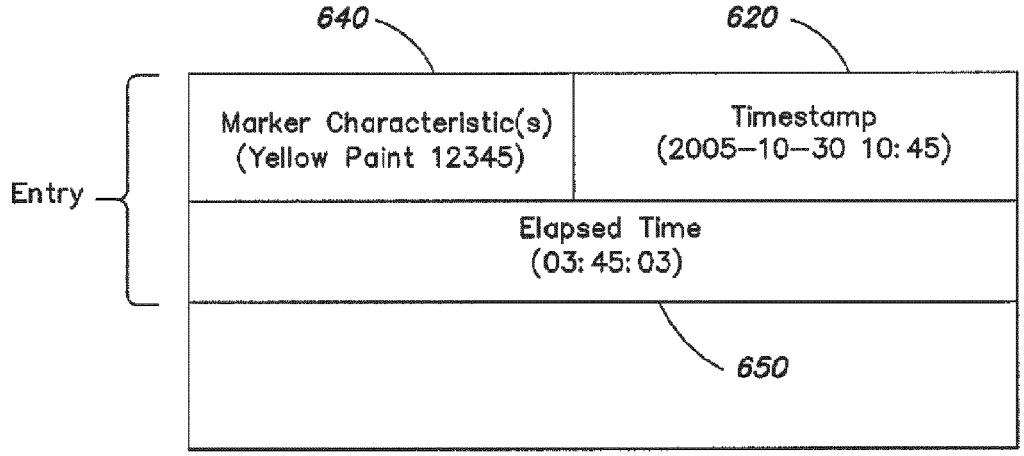

FIG. 6C is a diagram of another exemplary entry that may be created. As shown in FIG. 6C, an entry may include a marker characteristic(s) field 640, a timestamp field 620, and an elapsed time field 650. The marker characteristic(s) field 640 and the timestamp field 620 may be similar to the similarly named fields in FIG. 6A. In this case, however, the marker characteristic(s) field 640 may additionally store an identifier that identifies a particular marker (e.g., a particular canister of paint). The identifier is shown in FIG. 6C as "12345"—although any type of identifier may be used.

The elapsed time field 650 may include information that identifies the amount of time that has elapsed from when the user activated the trigger for dispensing a marker (e.g., yellow paint) to when the user ceased activating the trigger. The information in the elapsed time field 650 is shown in FIG. 6C as three minutes, forty five seconds, and three one hundredths of a second—although any time code can be used. The information in the elapsed time field 650 may be useful to determine or estimate when a supply of markers is nearly empty. The information in the elapsed time field 650 may help determine when to replace the canister. The elapsed time or a signal indicating that a supply of markers needs to be replaced may be presented to the user visually and/or audibly. The information in the elapsed time field 650 may also, or alternatively, be useful to determine or estimate an amount of markers used in a particular location.

While three exemplary entries have been described with regard to FIGS. 6A-6C, an entry may include more, fewer, different, or combinations of the fields shown in FIGS. 6A-6C.

The foregoing description is not intended to be exhaustive or to limit the description to the precise form disclosed. Modifications and variations are possible in light of the above disclosure or may be acquired from practice of the invention.

For example, the processors 140 and 268 can be general purpose computers. Alternatively, they can be special purpose computers, programmed microprocessors or microcontrollers and peripheral integrated circuit elements, ASICs or other integrated circuits, hardwired electronic or logic circuits such as discrete element circuits, programmable logic devices such as FPGA, PLD, PLA or PAL or the like. In general, any device capable of executing code can be used to implement processors 140 and 268. Local memories 130 and 270 can be implemented with any type of electronic memory and/or storage device using any type of media, such as magnetic, optical or other media.

Further, while a series of blocks have been illustrated in FIG. 5, the order of the blocks may differ in other implementations. Also, non-dependent blocks may be performed in parallel.

Also, it has been described that information regarding an elapsed time can be used to determine or estimate when a supply of markers is nearly empty. In another implementation, a sensor may be used to detect a weight of a paint canister 284. The sensor may be placed on the paint canister 284 or within the paint canister holder 282. The weight of the paint canister 284 may be used to estimate how full or empty the paint canister 284 is. This information may be provided to an operator of the marking tool 200 visually and/or audibly. In one implementation, replacing the paint canister 284 may trigger the identification of the marker characteristic (e.g., paint color) by the tag reader 246. This may help reduce the overall battery life of the tag reader 246 and/or the tag 286 by limiting the number of times that the tag reader 246 is used (e.g., only obtain the marker characteristic when the paint canister 284 is initially loaded into paint canister holder 282).

It will be apparent that aspects, as described above, may be implemented in many different forms of software, firmware, and hardware in the implementations illustrated in the figures. The actual software code or specialized control hardware used to implement these aspects is not limiting of the description provided herein. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for determining a correctness and/or a completeness of an operation to identify, in response to a ticket, a presence or an absence of an underground facility at a dig area, the system comprising:
   a communication system including an interconnection interface for receiving data relating to a use by a locate technician of at least one piece of equipment to perform the operation, in response to the ticket, to identify the presence or the absence of the underground facility at the dig area;
   a memory storing processor-executable instructions; and
   a processor, communicatively coupled to the communication system and the memory, wherein upon execution by the processor of the processor-executable instructions, the processor:
      controls the communication system so as to receive the data relating to the use by the locate technician of the at least one piece of equipment to perform, in response to the ticket, the operation to identify the presence or the absence of the underground facility at the dig area; and
   processes the data to determine whether the operation was completed correctly,
   wherein the at least one piece of equipment includes a marking apparatus used by the technician to dispense at least one marker to identify the presence or the absence of the underground facility, and wherein the data relates to the use of the marking apparatus.

2. The system of claim 1, further comprising the marking apparatus communicatively coupled to the communication system.

3. The system of claim 1, wherein:
   the data includes marker characteristic information representing a characteristic of the at least one marker dispensed by the marking apparatus; and
   the processor processes the data including the marker characteristic information to determine whether the operation was completed correctly.

4. The system of claim 3, wherein the marker characteristic information includes at least one of:
   a type of the at least one marker dispensed by the marking apparatus; and
   a color of the at least one marker dispensed by the marking apparatus.

5. The system of claim 1, wherein:
   the data includes timing information relating to the use by the technician of the marking apparatus to dispense the at least one marker; and
   the processor processes the data including the timing information to determine whether the operation was completed correctly.

6. The system of claim 5, wherein the timing information includes at least one of:
   a time at which the at least one marker was dispensed;
   a date on which the at least one marker was dispensed;
   a number of times that the at least one marker was dispensed; and
   an elapsed time during which the at least one marker was dispensed.

7. The system of claim 1, wherein:
   the data includes supply information representing an amount of the at least one marker dispensed by the marking apparatus; and
   the processor processes the data including the supply information to determine whether the operation was completed correctly.

8. The system of claim 1, wherein:
   the data includes location information representing a geographic location of the at least one marker dispensed by the marking apparatus; and
   the processor processes the data including the location information to determine whether the operation was completed correctly.

9. The system of claim 1, wherein:
   the data further includes ticket information from the ticket; and the processor processes the data including the ticket information to determine whether the operation was completed correctly.

10. The system of claim 9, wherein:

the data relating to the use by the locate technician of the at least one piece of equipment to perform the operation includes at least one of:

marker characteristic information representing a characteristic of the at least one marker dispensed by the marking apparatus;

timing information relating to the use by the technician of the marking apparatus to dispense the at least one marker;

supply information representing an amount of the at least one marker dispensed by the marking apparatus; and location information representing a geographic location of the at least one marker dispensed by the marking apparatus; and the processor processes the ticket information and the data relating to the use by the locate technician of the at least one piece of equipment to perform the operation to determine whether the operation was completed correctly.

11. A computer readable storage device encoded with at least one program including processor-executable instructions that, when executed by a processor, perform a method for determining a correctness and/or a completeness of an operation to identify, in response to a ticket, a presence or an absence of an underground facility at a dig area, the method comprising:

A) electronically receiving data relating to a use by a locate technician of at least one piece of equipment to perform the operation, in response to the ticket, to identify the presence or the absence of the underground facility at the dig area;

B) electronically receiving ticket information from the ticket; and

C) processing the ticket information received in B) and the data received in A) relating to the use by the locate technician of the at least one piece of equipment to perform the operation, to determine whether the operation was completed correctly, wherein:

the at least one piece of equipment includes a marking apparatus used by the technician to dispense at least one marker to identify the presence or the absence of the underground facility;

the data relates to the use of the marking apparatus and includes at least one of:

marker characteristic information representing a characteristic of the at least one marker dispensed by the marking apparatus;

timing information relating to the use by the technician of the marking apparatus to dispense the at least one marker;

supply information representing an amount of the at least one marker dispensed by the marking apparatus; and location information representing a geographic location of the at least one marker dispensed by the marking apparatus.

12. A method, comprising:

A) using at least one piece of equipment to perform an operation to identify, in response to a ticket, a presence or an absence of an underground facility at a dig area;

B) electronically receiving, by at least one processor, data relating to the use in A) of the at least one piece of equipment to perform the operation, in response to the ticket, to identify the presence or the absence of the underground facility at the dig area;

C) electronically receiving, by the at least one processor, ticket information from the ticket; and D) processing, by the at least one processor, the ticket information received in C) and the data received in B) relating to the use of the at least one piece of equipment to perform the operation, to determine whether the operation was completed correctly, wherein the at least one piece of equipment includes a marking apparatus, and wherein A) comprises:

using the marking apparatus to dispense at least one marker to identify the presence or the absence of the underground facility, wherein the data in B) relates to the use of the marking apparatus.

13. The method of claim 12, wherein:

the data includes marker characteristic information representing a characteristic of the at least one marker dispensed by the marking apparatus; and in D), the processor processes the data including the marker characteristic information to determine whether the operation was completed correctly.

14. The method of claim 13, wherein the marker characteristic information includes at least one of:

a type of the at least one marker dispensed by the marking apparatus; and a color of the at least one marker dispensed by the marking apparatus.

15. The method of claim 12, wherein:

the data includes timing information relating to the use of the marking apparatus to dispense the at least one marker; and in D), the processor processes the data including the timing information to determine whether the operation was completed correctly.

16. The method of claim 15, wherein the timing information includes at least one of:

a time at which the at least one marker was dispensed;

a date on which the at least one marker was dispensed;

a number of times that the at least one marker was dispensed; and an elapsed time during which the at least one marker was dispensed.

17. The method of claim 12, wherein:

the data includes supply information representing an amount of the at least one marker dispensed by the marking apparatus; and in D), the processor processes the data including the supply information to determine whether the operation was completed correctly.

18. The method of claim 12, wherein:

the data includes location information representing a geographic location of the at least one marker dispensed by the marking apparatus; and in D), the processor processes the data including the location information to determine whether the operation was completed correctly.

19. The method of claim 12, wherein:

the data relating to the use by the locate technician of the at least one piece of equipment to perform the operation includes at least one of:

marker characteristic information representing a characteristic of the at least one marker dispensed by the marking apparatus;

timing information relating to the use by the technician of the marking apparatus to dispense the at least one marker;

supply information representing an amount of the at least one marker dispensed by the marking apparatus; and location information representing a geographic location of the at least one marker dispensed by the marking apparatus; and in D), the processor processes the ticket information and the data relating to the use by the locate technician of the at least one piece of equipment to perform the operation to determine whether the operation was completed correctly.

20. The system of claim 4, wherein the system includes the marking apparatus, and wherein the marking apparatus generates the marker characteristic information.

21. The system of claim 20, wherein the marking apparatus includes a display to visually depict a dispensing of the at least one marker on an electronic representation of an area that is marked.

22. The system of claim 6, wherein the system includes the marking apparatus, and wherein the marking apparatus generates the timing information.

23. The system of claim 7, wherein the system includes the marking apparatus, and wherein the marking apparatus generates the supply information.

24. The system of claim 8, wherein the system includes the marking apparatus, and wherein the marking apparatus generates the location information.

25. The system of claim 10, wherein the system includes the marking apparatus, and wherein the marking apparatus includes at least one of:

a marker identification mechanism to provide the marker characteristic information;

a timing system to provide the timing information;

a weight sensor to provide the supply information; and a location tracking system to provide the location information.

* * * * *